(12) United States Patent
O'Lenick

(10) Patent No.: US 8,785,676 B1
(45) Date of Patent: Jul. 22, 2014

(54) CITRATE CO-POLYESTERS

(75) Inventor: Thomas George O'Lenick, Dacula, GA (US)

(73) Assignee: SurfaTech Corporation, Lawrenceville, GA (US)

( * ) Notice: Subject to any disclaimer, the term of this patent is extended or adjusted under 35 U.S.C. 154(b) by 258 days.

(21) Appl. No.: 13/374,704

(22) Filed: Jan. 10, 2012

Related U.S. Application Data

(60) Provisional application No. 61/627,445, filed on Oct. 13, 2011.

(51) Int. Cl.
*C07C 69/66* (2006.01)
*C08K 5/11* (2006.01)

(52) U.S. Cl.
USPC ............ 560/182; 560/180; 524/308; 524/311

(58) Field of Classification Search
USPC .......... 524/308, 311; 560/180, 182, 185, 186, 560/187
See application file for complete search history.

(56) References Cited

U.S. PATENT DOCUMENTS

| | | | |
|---|---|---|---|
| 4,868,236 A | | 9/1989 | O'Lenick |
| 2005/0063939 A1 | * | 3/2005 | Ameer et al. ............... 424/78.37 |

OTHER PUBLICATIONS

O'Lenick, Parkinson, Baffa, Guerbet Citrate Esters Allured IL, Aug. 1995.

* cited by examiner

*Primary Examiner* — Kendra D Carter
*Assistant Examiner* — Jason A Deck

(57) ABSTRACT

The present invention is directed to a series of citrate ester emulsifiers that are effective in making water in oil (regular emulsions) and oil in water (invert emulsions). In addition to being outstanding emulsifiers, these emulsifiers provide unique solubility, liquidity and outstanding feel when applied to the skin, making them highly desirable in cosmetic emulsions.

9 Claims, No Drawings

CITRATE CO-POLYESTERS

GOVERNMENT SPONSORSHIP

None

FIELD OF THE INVENTION

The present invention is directed to a series of citrate co-polymers film formers that are effective in making uniform films. In addition to being outstanding film formers, these co-polymers provide unique solubilities, liquidity and outstanding feel when applied to the skin, making them highly desirable in the cosmetic field.

BACKGROUND OF THE INVENTION

Citric acid is a common material of natural origin. The structure is:

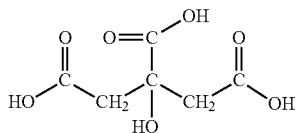

CAS Registry Number: 77-92-9

CAS Index Name: 1,2,3-Propanetricarboxylic Acid

Citric acid is made during the fermentation process; using cultures of *Aspergillus niger* are fed on a sucrose or glucose-containing medium.

Citric acid is one of a series of compounds involved in the physiological oxidation of fats, proteins, and carbohydrates to carbon dioxide and water. This series of chemical reactions is central to nearly all metabolic reactions, and is the source of two-thirds of the food-derived energy in higher organisms. Krebs received the 1953 Nobel Prize in physiology or Medicine for the discovery. The series of reactions is known by various names including, citric acid cycle, the Krebs cycle, and the tricarboxylic acid cycle.

Citrate esters are also well known. They conform to the following structure:

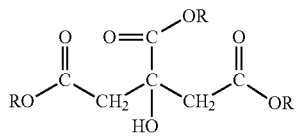

These esters are made by the reaction of citric acid with alcohols.

U.S. Pat. No. 4,292,192 issued to Hooper et al. teaches that detergent bars for personal washing are given a deodorant property by including an ester of citric acid. The ester maybe an acetyl derivative. The amount of ester used will be in the range of 0.3% to 3.0%. Examples of the esters are triethyl citrate and acetyl tributyl citrate.

An article published in Cosmetic and Toiletries Magazine (Vol. 110 August 1995) by O'Lenick et al addresses Guerbet Citrate Esters. It specifically deals with oil phase emollient esters and breathable non occlusive esters that have fluoro components contained in the ester. Both type of esters are hydrophobic (i.e. oil loving). This article discloses the state of the art of citrate esters, specifically as oil soluble materials that can be applied to skin. The article is posted on http://www.surfatech.com/pdfs/Guerbet%20Citrate%20Ester%20Article.pdf The ability to make compounds having differing solubility in water allows one to make surface active agents, or surfactants. The proper selection of the ratio of water soluble to oil soluble material in the molecule allows for the manufacture of emulsifiers useful over a wide range of formulations.

HLB is a methodology that explains this phenomenon. The method was developed by Griffin in 1954 and relates an estimation of surfactant properties to the percentage of water soluble group in a molecule. Specifically, the system addresses polyoxyethylene groups in a non-ionic surfactant/

HLB=% PEG in the molecule/5

HLB value of 0 corresponds to a completely hydrophobic molecule, and a value of 20 would correspond to a molecule made up completely of hydrophilic components.

The HLB value can be used to predict the surfactant properties of a molecule:
A value <10: Lipid soluble (water insoluble)
A value >10: Water soluble
A value from 4 to 8 indicates an anti-foaming agent
A value from 7 to 11 indicates a W/O (water in oil) emulsifier
A value from 12 to 16 indicates oil in water emulsion
A value from 11 to 14 indicates a wetting agent
A value from 12 to 15 is typical of detergents
A value of 16 to 20 indicates a solubiliser or hydrotrope.

The citrate esters known prior to the compounds of the present invention are oil phases. It was previously unappreciated that by making specific heretofore unknown esters, a series of citrate esters could be developed that are emulsifiers. There has been a long felt need for emulsifiers that provide excellent emulsification and citrate esters have not been available that had any water soluble groups, until this invention.

THE INVENTION

Object of the Invention

The current invention is directed toward a series of citrate ester co-polymers that contain polymeric alkoxylated groups that allow for the preparation of a series of film formers that range in solubilites.

SUMMARY OF THE INVENTION

The compounds of the present invention are citrate copolymers that have differing amounts of polyoxyethylene groups, fatty alcohols, fatty diols and poly(ethylene glycol) groups on the polymer backbone.

There are two necessary requirements to make the compounds of the present invention (1) the polymer must be made with alkoxylated methyl alcohol (thereby blocking one end of the polymer and increasing the polymers polarity.) and (2) the citrate copolymer must have as least one fatty group to promote surface activity.

The reaction of PEG (Poly(ethylene glycol)) with a citrate results in a polymer that have limited water solubility. Likewise, the reaction of a citrate with an alkyl diol will promote water in-solubility.

| | | |
|---|---|---|
| H-(OCH$_2$CH$_2$)$_9$OH | PEG 400 | Two Reactive OH groups |
| H-(OCH$_2$CH$_2$)$_9$OCH$_3$ | MePEG 400 | One Reactive OH Group |
| HO(CH$_2$)$_3$OH | 1,3 Propane Diol | Two Reactive OH Groups |
| HO(CH$_2$)$_2$CH$_3$ | 1-Propanol | One Reactive OH Group |

DETAILED DESCRIPTION OF THE INVENTION

The citrate co-polyesters of the present invention conform to the following structure:

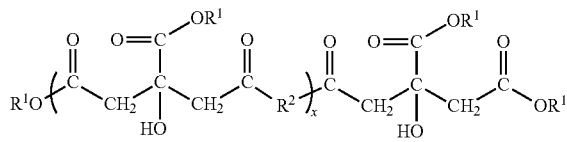

Wherein;
x is an integer ranging from 3 to 15;
$R^1$ is independently selected from groups consisting of —(CH$_2$CH$_2$O)$_a$CH$_3$, linear alkyl having 8 to 26 carbon atoms, and guerbet having 8 to 26 carbons, with the proviso that —(CH$_2$CH$_2$O)$_a$CH$_3$ makes up 4-95% of $R^1$;
a is an integer ranging from 5 to 25;
$R^2$ is independently selected from groups consisting of —O(CH$_2$)$_b$O—, and —O(CH$_2$CH$_2$O)$_c$—, with the proviso that —O(CH$_2$)$_b$O— makes up 4-95% of $R^2$;
b is an integer ranging from 2 to 12;
c is an integer ranging from 5 to 25.

Another aspect of the present invention is a process for conditioning skin, which comprises contacting the skin with an effective conditioning concentration of a citrate co-polyesters of the present invention conform to the following structure:

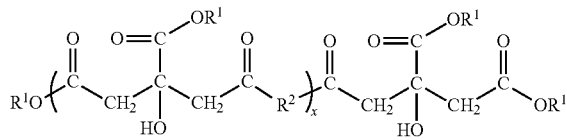

wherein;
x is an integer ranging from 3 to 15;
$R^1$ is independently selected from groups consisting of —(CH$_2$CH$_2$O)$_a$CH$_3$, linear alkyl having 8 to 26 carbon atoms, and guerbet having 8 to 26 carbons, with the proviso that —(CH$_2$CH$_2$O)$_a$CH$_3$ makes up 4-95% of $R^1$;
a is an integer ranging from 5 to 25;
$R^2$ is independently selected from groups consisting of —O(CH$_2$)$_b$O—, and —O(CH$_2$CH$_2$O)$_c$—, with the proviso that —O(CH$_2$)$_b$O— makes up 4-95% of $R^2$;
b is an integer ranging from 2 to 12;
c is an integer ranging from 5 to 25.

PREFERRED EMBODIMENT

In a preferred embodiment said effective conditioning concentration ranges from 0.1 to 20% by weight.
In a preferred embodiment a is an integer ranging from 5 to 15.
In a preferred embodiment a is an integer ranging from 20 to 25.
In a preferred embodiment x is 5.
In a preferred embodiment x is 15.
In a preferred embodiment x is 25.
In a preferred embodiment y is 2.
In a preferred embodiment y is 9.

EXAMPLES

Raw Materials

Poly(Ethylene Glycol) Monomethyl Ether
Poly(ethylene glycol) monomethyl ether is commercially available from a variety of sources one of which is FCI Technology of Gastonia, N.C. It conforms to the following structure;

CH$_3$(CH$_2$CH$_2$O)$_a$—H wherein;
a is an integer from 5 to 25;

| Example | a | Molecular Weight (g/mol) |
|---|---|---|
| 1 | 5 | 237 |
| 2 | 8 | 367 |
| 3 | 15 | 676 |
| 4 | 23 | 1027 |
| 5 | 25 | 1116 |

Fatty Alcohols
Fatty alcohols are useful in the practice of the present invention are items of commerce they are available as either single components or mixtures.

Fatty alcohols are useful as raw materials in the preparation of compounds of the present invention are commercially available from a variety of sources including Procter and Gamble of Cincinnati Ohio.

The structures are well known to those skilled in the art.

R—OH

| | | Saturated | |
|---|---|---|---|
| Example | R Formula | Common Name | Molecular Weight |
| 6 | C$_8$H$_{18}$ | Capryl | 130 |
| 7 | C$_{10}$H$_{22}$ | Capric | 158 |
| 8 | C$_{12}$H$_{25}$ | Lauryl | 186 |
| 9 | C$_{14}$H$_{30}$ | Myristyl | 214 |
| 10 | C$_{15}$H$_{32}$ | Pentadecyl | 229 |
| 11 | C$_{16}$H$_{34}$ | Cetyl | 243 |
| 12 | C$_{18}$H$_{36}$ | Stearyl | 269 |
| 13 | C$_{20}$H$_{40}$ | Arachidyl | 297 |
| 14 | C$_{22}$H$_{44}$ | Behenyl | 325 |
| 15 | C$_{26}$H$_{52}$ | Cetryl | 381 |
| 16 | C$_{34}$H$_{68}$ | Geddyl | 493 |

| | | Unsaturated | |
|---|---|---|---|
| Example | R Formula | Common Name | Molecular Weight |
| 17 | C$_{18}$H$_{36}$ | Oleyl | 268 |
| 18 | C$_{18}$H$_{34}$ | Linoleyl | 266 |

Guerbet Alcohols
Guerbet alcohols useful as raw materials in the preparation of compounds of the present invention are commercially available from a variety of sources including Sasol North America Incorporated of Houston Tex.

The structures are well known to those skilled in the art.

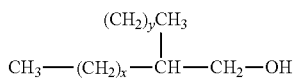

y is an integer ranging from 3-15 and x is an integer ranging from 5-17.

| Example | y | x |
|---------|----|----|
| 19 | 15 | 17 |
| 20 | 3 | 5 |
| 21 | 9 | 7 |

Poly(Ethylene Glycol)

Poly(ethylene glycol) is an item of commerce available from a variety of sources including FCI Incorporated in. It conforms to the following structure:

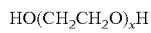

HO(CH$_2$CH$_2$O)$_x$H x is an integer ranging from 5 to 25.

| Example | x | MW |
|---------|----|-------|
| 22 | 5 | 220 |
| 23 | 15 | 660 |
| 24 | 25 | 1,100 |

Alkyl Diols

They conform to the following structure:

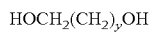

HOCH$_2$(CH$_2$)$_y$OH wherein;
y is an integer ranging from 2 to 11

| Example | y | MW |
|---------|----|-----|
| 25 | 2 | 76 |
| 26 | 9 | 174 |
| 27 | 11 | 202 |

Citric Acid

Citric acid is an item of commerce available from a variety of sources including Pfizer. It conforms to the following structure:

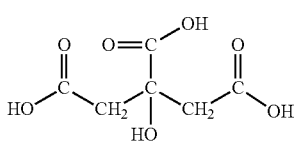 [SMILES: O=C(O)CC(O)(CC(=O)O)C(=O)O]

Citric acid is 2-hydroxypropane-1,2,3-tricarboxylic acid and has a CAS number of 77-92-9.

Compounds of the Present Invention

Poly(Ethylene Glycol) Mono Methyl Ether, Alkyl Citrate Polymers

Citrate polymers were prepared by SurfaTech Corporation, of Lawernceville, Ga. They are made by the esterification reaction of citric acid, methoxy-poly (ethylene glycol), a fatty alcohol and an alkyl diol. Poly (ethylene glycol). They conform to the following structure;

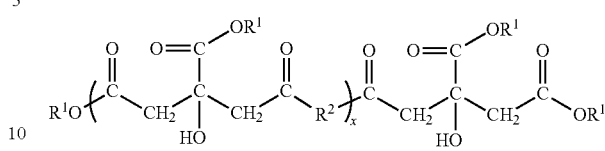

wherein;
R$^1$ is independently selected from groups consisting of —(CH$_2$CH$_2$O)$_a$CH$_3$, linear alkyl having 8 to 26 carbon atoms, and a Guerbet alkyl having 8 to 26 carbons, with the proviso that —(CH$_2$CH$_2$O)$_a$CH$_3$ makes up 4-95% of R$^1$;
a is an integer ranging from 5 to 25;
R$^2$ is —O(CH$_2$)$_b$O—;
b is an integer ranging from 2 to 12;
x is an integer ranging from 3 to 15;

| | | Outside Alcohol R$^1$ | | Repeat Unit R$^2$ | | Citric Acid |
|---------|---------|-------|---------|-------|-------|-------|
| Example | Example | Grams | Example | Grams | Example | Grams | Grams |
| 28 | 2 | 20.9 | 20 | 44.4 | 25 | 22.7 | 68.7 |
| 29 | 2 | 112.3 | 20 | 14.9 | 25 | 30.5 | 92.4 |
| 30 | 2 | 16.0 | 20 | 102.3 | 25 | 34.8 | 96.8 |
| 31 | 2 | 83.5 | 20 | 17.9 | 25 | 22.7 | 126.0 |
| 32 | 2 | 28.4 | 21 | 97.3 | 25 | 30.8 | 93.4 |
| 33 | 2 | 108.3 | 21 | 23.2 | 25 | 29.4 | 89.1 |
| 34 | 2 | 12.8 | 21 | 131.9 | 25 | 27.9 | 89.1 |
| 35 | 2 | 83.5 | 21 | 17.9 | 25 | 22.7 | 126.0 |
| 36 | 2 | 33.3 | 8 | 70.8 | 25 | 36.2 | 109.7 |
| 37 | 2 | 112.3 | 8 | 14.9 | 25 | 30.5 | 92.4 |
| 38 | 2 | 16.0 | 8 | 102.3 | 25 | 34.8 | 96.8 |
| 39 | 2 | 83.5 | 8 | 17.9 | 25 | 22.7 | 126.0 |
| 40 | 2 | 29.5 | 12 | 91.2 | 25 | 32.1 | 97.2 |
| 41 | 2 | 109.3 | 12 | 21.1 | 25 | 29.7 | 89.9 |
| 42 | 2 | 13.5 | 12 | 125.3 | 25 | 29.4 | 81.7 |
| 43 | 2 | 83.5 | 12 | 17.9 | 25 | 22.7 | 126.0 |
| 44 | 2 | 27.5 | 14 | 102.1 | 25 | 29.9 | 90.5 |
| 45 | 2 | 107.5 | 14 | 24.9 | 25 | 29.2 | 88.4 |
| 46 | 2 | 12.3 | 14 | 136.9 | 25 | 26.7 | 74.1 |
| 47 | 2 | 83.5 | 14 | 17.9 | 25 | 22.7 | 126.0 |
| 48 | 2 | 37.1 | 20 | 78.9 | 22 | 11.7 | 122.2 |
| 49 | 2 | 122.9 | 20 | 16.3 | 22 | 9.7 | 101.1 |
| 50 | 2 | 17.8 | 20 | 113.6 | 22 | 11.2 | 107.4 |
| 51 | 2 | 83.5 | 20 | 17.9 | 22 | 22.7 | 126.0 |
| 52 | 2 | 31.1 | 21 | 106.7 | 22 | 9.8 | 102.4 |
| 53 | 2 | 118.2 | 21 | 25.3 | 22 | 9.3 | 97.2 |
| 54 | 2 | 13.9 | 21 | 143.3 | 22 | 8.8 | 84.0 |
| 55 | 2 | 83.5 | 21 | 17.9 | 22 | 22.7 | 126.0 |
| 56 | 2 | 37.1 | 8 | 78.9 | 22 | 11.7 | 122.2 |
| 57 | 2 | 122.9 | 8 | 16.3 | 22 | 9.7 | 101.1 |
| 58 | 2 | 17.8 | 8 | 113.6 | 22 | 11.2 | 107.4 |
| 59 | 2 | 83.5 | 8 | 17.9 | 22 | 22.7 | 126.0 |
| 60 | 2 | 32.5 | 12 | 100.3 | 22 | 10.2 | 107.0 |
| 61 | 2 | 119.4 | 12 | 23.0 | 22 | 9.4 | 98.2 |
| 62 | 2 | 14.8 | 12 | 136.8 | 22 | 9.3 | 89.2 |
| 63 | 2 | 83.5 | 12 | 17.9 | 22 | 22.7 | 126.0 |
| 64 | 2 | 30.0 | 14 | 111.6 | 22 | 9.4 | 98.9 |
| 65 | 2 | 117.2 | 14 | 27.2 | 22 | 9.2 | 96.4 |
| 66 | 2 | 13.3 | 14 | 148.1 | 22 | 8.4 | 80.2 |
| 67 | 2 | 83.5 | 14 | 17.9 | 22 | 22.7 | 126.0 |
| 68 | 2 | 15.8 | 20 | 33.5 | 23 | 148.8 | 51.9 |
| 69 | 2 | 58.0 | 20 | 7.7 | 23 | 136.6 | 47.7 |
| 70 | 2 | 7.7 | 20 | 49.4 | 23 | 146.1 | 46.8 |
| 71 | 2 | 83.5 | 20 | 17.9 | 23 | 22.7 | 126.0 |
| 72 | 2 | 14.6 | 21 | 50.0 | 23 | 137.5 | 48.0 |
| 73 | 2 | 56.9 | 21 | 12.2 | 23 | 134.1 | 46.8 |
| 74 | 2 | 6.9 | 21 | 71.1 | 23 | 130.3 | 41.7 |
| 75 | 2 | 83.5 | 21 | 17.9 | 23 | 22.7 | 126.0 |
| 76 | 2 | 15.8 | 8 | 33.5 | 23 | 148.8 | 51.9 |

| Example | Example | Outside Alcohol R¹ Grams | Example | Grams | Repeat Unit R² Example | Grams | Citric Acid Grams |
|---|---|---|---|---|---|---|---|
| 77 | 2 | 58.0 | 8 | 7.7 | 23 | 136.6 | 47.7 |
| 78 | 2 | 7.7 | 8 | 49.4 | 23 | 146.1 | 46.8 |
| 79 | 2 | 83.5 | 8 | 17.9 | 23 | 22.7 | 126.0 |
| 80 | 2 | 14.9 | 12 | 45.9 | 23 | 140.3 | 49.0 |
| 81 | 2 | 57.2 | 12 | 11.0 | 23 | 134.8 | 47.0 |
| 82 | 2 | 7.1 | 12 | 65.8 | 23 | 134.1 | 42.9 |
| 83 | 2 | 83.5 | 12 | 17.9 | 23 | 22.7 | 126.0 |
| 84 | 2 | 14.3 | 14 | 53.3 | 23 | 135.2 | 47.2 |
| 85 | 2 | 56.7 | 14 | 13.2 | 23 | 133.6 | 46.6 |
| 86 | 2 | 6.8 | 14 | 75.2 | 23 | 127.3 | 40.7 |
| 87 | 2 | 83.5 | 14 | 17.9 | 23 | 22.7 | 126.0 |
| 88 | 2 | 11.3 | 20 | 24.0 | 24 | 177.5 | 37.2 |
| 89 | 2 | 42.5 | 20 | 5.6 | 24 | 166.9 | 35.0 |
| 90 | 2 | 5.6 | 20 | 35.6 | 24 | 175.2 | 33.6 |
| 91 | 2 | 83.5 | 20 | 17.9 | 24 | 22.7 | 126.0 |
| 92 | 2 | 10.7 | 21 | 36.6 | 24 | 167.6 | 35.1 |
| 93 | 2 | 41.9 | 21 | 9.0 | 24 | 164.6 | 34.5 |
| 94 | 2 | 5.1 | 21 | 52.7 | 24 | 161.2 | 30.9 |
| 95 | 2 | 83.5 | 21 | 17.9 | 24 | 22.7 | 126.0 |
| 96 | 2 | 11.3 | 8 | 24.0 | 24 | 177.5 | 37.2 |
| 97 | 2 | 42.5 | 8 | 5.6 | 24 | 166.9 | 35.0 |
| 98 | 2 | 5.6 | 8 | 35.6 | 24 | 175.2 | 33.6 |
| 99 | 2 | 83.5 | 8 | 17.9 | 24 | 22.7 | 126.0 |
| 100 | 2 | 10.8 | 12 | 33.4 | 24 | 170.1 | 35.6 |
| 101 | 2 | 42.1 | 12 | 8.1 | 24 | 165.2 | 34.6 |
| 102 | 2 | 5.2 | 12 | 48.5 | 24 | 164.7 | 31.6 |
| 103 | 2 | 83.5 | 12 | 17.9 | 24 | 22.7 | 126.0 |
| 104 | 2 | 10.5 | 14 | 39.1 | 24 | 165.6 | 34.7 |
| 105 | 2 | 41.8 | 14 | 9.7 | 24 | 164.1 | 34.4 |
| 106 | 2 | 5.0 | 14 | 56.2 | 24 | 158.4 | 30.4 |
| 107 | 2 | 83.5 | 14 | 17.9 | 24 | 22.7 | 126.0 |
| 108 | 2 | 28.1 | 20 | 59.7 | 26 | 69.8 | 92.4 |
| 109 | 2 | 97.0 | 20 | 12.9 | 26 | 60.3 | 79.8 |
| 110 | 2 | 13.6 | 20 | 86.7 | 26 | 67.6 | 82.1 |
| 111 | 2 | 83.5 | 20 | 17.9 | 26 | 22.7 | 126.0 |
| 112 | 2 | 24.5 | 21 | 84.0 | 26 | 60.9 | 80.6 |
| 113 | 2 | 94.0 | 21 | 20.2 | 26 | 58.4 | 77.4 |
| 114 | 2 | 11.2 | 21 | 115.4 | 26 | 55.8 | 67.7 |
| 115 | 2 | 83.5 | 21 | 17.9 | 26 | 22.7 | 126.0 |
| 116 | 2 | 28.1 | 8 | 59.7 | 26 | 69.8 | 92.4 |
| 117 | 2 | 97.0 | 8 | 12.9 | 26 | 60.3 | 79.8 |
| 118 | 2 | 13.6 | 8 | 86.7 | 26 | 67.6 | 82.1 |
| 119 | 2 | 83.5 | 8 | 17.9 | 26 | 22.7 | 126.0 |
| 120 | 2 | 25.3 | 12 | 78.2 | 26 | 63.0 | 83.4 |
| 121 | 2 | 94.8 | 12 | 18.3 | 26 | 58.9 | 78.0 |
| 122 | 2 | 11.8 | 12 | 108.8 | 26 | 58.5 | 70.9 |
| 123 | 2 | 83.5 | 12 | 17.9 | 26 | 22.7 | 126.0 |
| 124 | 2 | 23.8 | 14 | 88.5 | 26 | 59.2 | 78.4 |
| 125 | 2 | 93.4 | 14 | 21.7 | 26 | 58.0 | 76.9 |
| 126 | 2 | 10.8 | 14 | 120.3 | 26 | 53.7 | 65.2 |
| 127 | 2 | 83.5 | 14 | 17.9 | 26 | 22.7 | 126.0 |
| 128 | 2 | 26.9 | 20 | 57.1 | 27 | 77.5 | 88.5 |
| 129 | 2 | 93.4 | 20 | 12.4 | 27 6 | 7.4 | 76.8 |
| 130 | 2 | 13.0 | 20 | 83.1 | 27 | 75.2 | 78.6 |
| 131 | 2 | 83.5 | 20 | 17.9 | 27 | 22.7 | 126.0 |
| 132 | 2 | 23.6 | 21 | 80.8 | 27 | 68.0 | 77.6 |
| 133 | 2 | 90.6 | 21 | 19.4 | 27 | 65.4 | 74.6 |
| 134 | 2 | 10.8 | 21 | 111.4 | 27 | 62.5 | 65.3 |
| 135 | 2 | 83.5 | 21 | 17.9 | 27 | 22.7 | 126.0 |
| 136 | 2 | 26.9 | 8 | 57.1 | 27 | 77.5 | 88.5 |
| 137 | 2 | 93.4 | 8 | 12.4 | 27 | 67.4 | 76.8 |
| 138 | 2 | 13.0 | 8 | 83.1 | 27 | 75.2 | 78.6 |
| 139 | 2 | 83.5 | 8 | 17.9 | 27 | 22.7 | 126.0 |
| 140 | 2 | 24.4 | 12 | 75.2 | 27 | 70.3 | 80.2 |
| 141 | 2 | 91.3 | 12 | 17.6 | 27 | 65.9 | 75.2 |
| 142 | 2 | 11.3 | 12 | 104.9 | 27 | 65.4 | 68.4 |
| 143 | 2 | 83.5 | 12 | 17.9 | 27 | 22.7 | 126.0 |
| 144 | 2 | 23.0 | 14 | 85.3 | 27 | 66.2 | 75.6 |
| 145 | 2 | 90.0 | 14 | 20.9 | 27 | 65.0 | 74.1 |
| 146 | 2 | 10.4 | 14 | 116.3 | 27 | 60.2 | 63.0 |
| 147 | 2 | 83.5 | 14 | 17.9 | 27 | 22.7 | 126.0 |

EXAMPLES

Esterification Reactions

In addition to the molecular weight of poly(ethylene glycol) monomethyl ether (MePEG), it is very important for the practice of the current invention resulting in a compound of the present, to have the correct ratio of fatty groups to MePEG groups. Also, the length of the alkyl diol and molecular weight of the polymer is of paramount importance.

General Procedure

To the specified number of grams of citric acid is added to a specified amount of MePEG (Examples 2-5) and the specified number of grams of alcohol (Examples 6-21). The reaction mixture is heated to 160-180° C. The alkyl diol is added when the temperature is reached. Water is removed by vacuum during the reaction process. The reaction is monitored by determination of acid value. The acid value will diminish as the reaction proceeds. The reaction is cooled once the acid value fails to change over an additional two hours at temperature. The product is used without purification.

Poly(Ethylene Glycol) Mono Methyl Ether, Di-Alkyl Citrate Co-Polymers

Citrate di-alkyl co-polymers were prepared by SurfaTech Corporation, of Lawernceville, Ga. They are made by the esterification reaction of citric acid, methoxy-poly (ethylene glycol), a fatty alcohol and at least two different alkyl diol.

| Example | Example | Outside Alcohol R¹ Grams | Example | Grams | Repeat Unit R² Example | Grams | Citric Acid Grams |
|---|---|---|---|---|---|---|---|
| 148 | 2 | 32.1 | 20 | 68.3 | 25 | 27.9 | 26 | 16.0 | 105.7 |
| 149 | 2 | 108.8 | 20 | 14.5 | 25 | 23.6 | 26 | 13.5 | 89.6 |
| 150 | 2 | 29.0 | 20 | 61.6 | 25 | 6.3 | 26 | 57.7 | 95.4 |
| 151 | 2 | 99.7 | 20 | 13.2 | 25 | 5.4 | 26 | 49.6 | 82.1 |
| 152 | 2 | 27.3 | 21 | 93.5 | 25 | 23.7 | 27 | 15.7 | 89.8 |
| 153 | 2 | 104.2 | 21 | 22.3 | 25 | 22.6 | 27 | 15.0 | 85.8 |
| 154 | 2 | 24.4 | 21 | 83.7 | 25 | 5.3 | 27 | 56.3 | 80.3 |
| 155 | 2 | 93.7 | 21 | 20.1 | 25 | 5.1 | 27 | 54.1 | 77.1 |
| 156 | 2 | 32.1 | 8 | 68.3 | 25 | 27.9 | 26 | 16.0 | 105.7 |
| 157 | 2 | 108.8 | 8 | 14.5 | 25 | 23.6 | 26 | 13.5 | 89.6 |
| 158 | 2 | 29.0 | 8 | 61.6 | 25 | 6.3 | 26 | 57.7 | 95.4 |
| 159 | 2 | 99.7 | 8 | 13.2 | 25 | 5.4 | 26 | 49.6 | 82.1 |
| 160 | 2 | 28.3 | 12 | 87.4 | 25 | 24.6 | 27 | 16.4 | 93.3 |
| 161 | 2 | 105.2 | 12 | 20.3 | 25 | 22.8 | 27 | 15.2 | 86.5 |

-continued

| | | Outside Alcohol $R^1$ | | | | Repeat Unit $R^2$ | | | Citric Acid |
|---|---|---|---|---|---|---|---|---|---|
| Example | Example | Grams | Example | Grams | Example | Grams | Example | Grams | Grams |
| 162 | 2 | 25.2 | 12 | 77.9 | 25 | 5.5 | 27 | 58.3 | 83.1 |
| 163 | 2 | 94.4 | 12 | 18.2 | 25 | 5.1 | 27 | 54.5 | 77.7 |
| 164 | 2 | 23.1 | 14 | 85.9 | 27 | 53.4 | 26 | 11.5 | 76.1 |
| 165 | 2 | 90.7 | 14 | 21.1 | 27 | 52.3 | 26 | 11.3 | 74.6 |
| 166 | 2 | 23.6 | 14 | 87.8 | 27 | 13.6 | 26 | 47.0 | 77.8 |
| 167 | 2 | 92.7 | 14 | 21.5 | 27 | 13.4 | 26 | 46.1 | 76.3 |

Poly(Ethylene Glycol) Mono Methyl Ether, Alkyl PEG Citrate Copolymers

Alkyl/PEG citrate co-polymers were prepared by SurfaTech Corporation, of Lawernceville, Ga. They are made by the esterification reaction of citric acid, methoxy-poly (ethylene glycol), a fatty alcohol, alkyl diol and poly(ethylene glycol).

| | | Outside Alcohol $R^1$ | | | | Repeat Unit $R^2$ | | | Citric Acid |
|---|---|---|---|---|---|---|---|---|---|
| Example | Example | Grams | Example | Grams | Example | Grams | Example | Grams | Grams |
| 168 | 2 | 21.1 | 20 | 44.8 | 27 | 48.6 | 24 | 66.2 | 69.3 |
| 169 | 2 | 75.3 | 20 | 10.0 | 27 | 43.5 | 24 | 59.2 | 62.0 |
| 170 | 2 | 12.8 | 20 | 27.2 | 27 | 7.4 | 24 | 160.6 | 42.1 |
| 171 | 2 | 47.7 | 20 | 6.3 | 27 | 6.9 | 24 | 149.9 | 39.2 |
| 172 | 2 | 19.0 | 21 | 65.1 | 27 | 43.8 | 24 | 59.7 | 62.5 |
| 173 | 2 | 73.5 | 21 | 15.8 | 27 | 42.4 | 24 | 57.8 | 60.5 |
| 174 | 2 | 12.0 | 21 | 41.1 | 27 | 6.9 | 24 | 150.6 | 39.4 |
| 175 | 2 | 47.0 | 21 | 10.1 | 27 | 6.8 | 24 | 147.6 | 38.6 |
| 176 | 2 | 21.1 | 8 | 44.8 | 27 | 48.6 | 24 | 66.2 | 69.3 |
| 177 | 2 | 75.3 | 8 | 10.0 | 27 | 43.5 | 24 | 59.2 | 62.0 |
| 178 | 2 | 12.8 | 8 | 27.2 | 27 | 7.4 | 24 | 160.6 | 42.1 |
| 179 | 2 | 47.7 | 8 | 6.3 | 27 | 6.9 | 24 | 149.9 | 39.2 |
| 180 | 2 | 19.5 | 12 | 60.1 | 27 | 45.0 | 24 | 61.2 | 64.1 |
| 181 | 2 | 74.0 | 12 | 14.3 | 27 | 42.7 | 24 | 58.1 | 60.9 |
| 182 | 2 | 12.2 | 12 | 37.6 | 27 | 7.0 | 24 | 153.1 | 40.1 |
| 183 | 2 | 47.1 | 12 | 9.1 | 27 | 6.8 | 24 | 148.2 | 38.8 |
| 184 | 2 | 18.6 | 14 | 69.0 | 27 | 42.9 | 24 | 58.4 | 61.1 |
| 185 | 2 | 73.1 | 14 | 17.0 | 27 | 42.2 | 24 | 57.5 | 60.2 |
| 186 | 2 | 11.8 | 14 | 43.9 | 27 | 6.8 | 24 | 148.6 | 38.9 |
| 187 | 2 | 46.8 | 14 | 10.9 | 27 | 6.8 | 24 | 147.1 | 38.5 |
| 188 | 2 | 23.6 | 20 | 50.1 | 27 | 54.4 | 23 | 44.4 | 77.5 |
| 189 | 2 | 83.2 | 20 | 11.1 | 27 | 48.0 | 23 | 39.2 | 68.5 |
| 190 | 2 | 17.2 | 20 | 36.6 | 27 | 9.9 | 23 | 129.7 | 56.6 |
| 191 | 2 | 62.7 | 20 | 8.3 | 27 | 9.1 | 23 | 118.3 | 51.6 |
| 192 | 2 | 21.0 | 21 | 71.9 | 27 | 48.4 | 23 | 39.6 | 69.1 |
| 193 | 2 | 81.0 | 21 | 17.4 | 27 | 46.8 | 23 | 38.2 | 66.7 |
| 194 | 2 | 15.8 | 21 | 54.1 | 27 | 9.1 | 23 | 119.0 | 51.9 |
| 195 | 2 | 61.5 | 21 | 13.2 | 27 | 8.9 | 23 | 115.9 | 50.6 |
| 196 | 2 | 23.6 | 8 | 50.1 | 27 | 54.4 | 23 | 44.4 | 77.5 |
| 197 | 2 | 83.2 | 8 | 11.1 | 27 | 48.0 | 23 | 39.2 | 68.5 |
| 198 | 2 | 17.2 | 8 | 36.6 | 27 | 9.9 | 23 | 129.7 | 56.6 |
| 199 | 2 | 62.7 | 8 | 8.3 | 27 | 9.1 | 23 | 118.3 | 51.6 |
| 200 | 2 | 21.6 | 12 | 66.7 | 27 | 49.9 | 23 | 40.7 | 71.1 |
| 201 | 2 | 81.6 | 12 | 15.7 | 27 | 47.1 | 23 | 38.5 | 67.1 |
| 202 | 2 | 16.1 | 12 | 49.8 | 27 | 9.3 | 23 | 121.7 | 53.1 |
| 203 | 2 | 61.8 | 12 | 11.9 | 27 | 8.9 | 23 | 116.5 | 50.8 |
| 204 | 2 | 20.5 | 14 | 76.1 | 27 | 47.3 | 23 | 38.6 | 67.4 |
| 205 | 2 | 80.6 | 14 | 18.7 | 27 | 46.5 | 23 | 38.0 | 66.3 |
| 206 | 2 | 15.5 | 14 | 57.6 | 27 | 8.9 | 23 | 116.9 | 51.0 |
| 207 | 2 | 61.2 | 14 | 14.2 | 27 | 8.8 | 23 | 115.4 | 50.4 |
| 208 | 2 | 26.7 | 20 | 56.8 | 27 | 61.7 | 22 | 16.8 | 88.0 |
| 209 | 2 | 92.9 | 20 | 12.3 | 27 | 53.6 | 22 | 14.6 | 76.5 |
| 210 | 2 | 26.3 | 20 | 55.9 | 27 | 15.2 | 22 | 66.1 | 86.5 |
| 211 | 2 | 91.6 | 20 | 12.2 | 27 | 13.2 | 22 | 57.6 | 75.4 |
| 212 | 2 | 23.5 | 21 | 80.4 | 27 | 54.2 | 22 | 14.7 | 77.2 |
| 213 | 2 | 90.2 | 21 | 19.3 | 27 | 52.1 | 22 | 14.2 | 74.2 |
| 214 | 2 | 23.1 | 21 | 79.3 | 27 | 13.3 | 22 | 58.1 | 76.1 |
| 215 | 2 | 89.0 | 21 | 19.1 | 27 | 12.8 | 22 | 55.9 | 73.2 |
| 216 | 2 | 26.7 | 8 | 56.8 | 27 | 61.7 | 22 | 16.8 | 88.0 |
| 217 | 2 | 92.9 | 8 | 12.3 | 27 | 53.6 | 22 | 14.6 | 76.5 |
| 218 | 2 | 26.3 | 8 | 55.9 | 27 | 15.2 | 22 | 66.1 | 86.5 |
| 219 | 2 | 91.6 | 8 | 12.2 | 27 | 13.2 | 22 | 57.6 | 75.4 |
| 220 | 2 | 24.2 | 12 | 74.8 | 27 | 56.0 | 22 | 15.2 | 79.8 |
| 221 | 2 | 90.9 | 12 | 17.5 | 27 | 52.5 | 22 | 14.3 | 74.8 |

-continued

| | Outside Alcohol R¹ | | Repeat Unit R² | | | | Citric Acid | |
|---|---|---|---|---|---|---|---|---|
| Example | Example | Grams | Example | Grams | Example | Grams | Example | Grams | Grams |
| 222 | 2 | 23.9 | 12 | 73.7 | 27 | 13.8 | 22 | 60.0 | 78.6 |
| 223 | 2 | 89.7 | 12 | 17.3 | 27 | 12.9 | 22 | 56.4 | 73.8 |
| 224 | 2 | 22.8 | 14 | 84.9 | 27 | 52.7 | 22 | 14.4 | 75.2 |
| 225 | 2 | 89.6 | 14 | 20.8 | 27 | 51.7 | 22 | 14.1 | 73.8 |
| 226 | 2 | 22.5 | 14 | 83.7 | 27 | 13.0 | 22 | 56.6 | 74.2 |
| 227 | 2 | 88.4 | 14 | 20.5 | 27 | 12.8 | 22 | 55.6 | 72.7 |
| 228 | 2 | 22.0 | 12 | 67.7 | 25 | 19.1 | 24 | 60.0 | 72.3 |
| 229 | 2 | 82.8 | 12 | 16.0 | 25 | 18.0 | 24 | 65.1 | 68.1 |
| 230 | 2 | 12.4 | 12 | 38.3 | 25 | 2.7 | 24 | 155.9 | 40.8 |
| 231 | 2 | 48.0 | 12 | 9.2 | 25 | 2.6 | 24 | 150.7 | 39.5 |
| 232 | 2 | 24.0 | 8 | 51.0 | 25 | 20.8 | 24 | 75.3 | 78.9 |
| 233 | 2 | 84.5 | 8 | 11.2 | 25 | 18.3 | 24 | 66.4 | 69.5 |
| 234 | 2 | 13.0 | 8 | 27.7 | 25 | 2.8 | 24 | 163.6 | 42.8 |
| 235 | 2 | 48.5 | 8 | 6.4 | 25 | 2.6 | 24 | 152.5 | 39.9 |
| 236 | 2 | 23.2 | 14 | 86.3 | 25 | 20.2 | 23 | 43.8 | 76.5 |
| 237 | 2 | 91.1 | 14 | 21.2 | 25 | 19.8 | 23 | 43.0 | 75.0 |
| 238 | 2 | 15.9 | 14 | 58.9 | 25 | 3.4 | 23 | 119.6 | 52.2 |
| 239 | 2 | 62.6 | 14 | 14.5 | 25 | 3.4 | 23 | 118.0 | 51.5 |
| 240 | 2 | 23.9 | 21 | 81.8 | 25 | 20.7 | 23 | 45.0 | 78.6 |
| 241 | 2 | 91.7 | 21 | 19.7 | 25 | 19.9 | 23 | 43.2 | 75.5 |
| 242 | 2 | 16.1 | 21 | 55.4 | 25 | 3.5 | 23 | 121.8 | 53.2 |
| 243 | 2 | 62.9 | 21 | 13.5 | 25 | 3.4 | 23 | 118.5 | 51.7 |
| 244 | 2 | 28.2 | 12 | 86.9 | 25 | 24.5 | 22 | 17.7 | 92.7 |
| 245 | 2 | 104.6 | 12 | 20.2 | 25 | 22.7 | 22 | 16.4 | 86.1 |
| 246 | 2 | 24.7 | 12 | 76.3 | 25 | 5.4 | 22 | 62.2 | 81.4 |
| 247 | 2 | 92.6 | 12 | 17.9 | 25 | 5.0 | 22 | 58.2 | 76.2 |
| 248 | 2 | 21.6 | 8 | 46.0 | 26 | 43.0 | 24 | 68.0 | 71.3 |
| 249 | 2 | 77.2 | 8 | 10.3 | 26 | 38.4 | 24 | 60.7 | 63.5 |
| 250 | 2 | 12.8 | 8 | 27.3 | 26 | 6.4 | 24 | 161.3 | 42.2 |
| 251 | 2 | 47.9 | 8 | 6.4 | 26 | 5.9 | 24 | 150.4 | 39.4 |
| 252 | 2 | 24.3 | 20 | 51.6 | 26 | 48.3 | 23 | 45.8 | 80.0 |
| 253 | 2 | 85.5 | 20 | 11.4 | 26 | 42.5 | 23 | 40.3 | 70.3 |
| 254 | 2 | 17.3 | 20 | 36.8 | 26 | 8.6 | 23 | 130.4 | 56.9 |
| 255 | 2 | 63.0 | 20 | 8.4 | 26 | 7.8 | 23 | 118.9 | 51.9 |
| 256 | 2 | 23.5 | 14 | 87.4 | 26 | 46.8 | 22 | 14.8 | 77.5 |
| 257 | 2 | 92.3 | 14 | 21.4 | 26 | 45.9 | 22 | 14.5 | 75.9 |
| 258 | 2 | 22.7 | 14 | 84.3 | 26 | 11.3 | 22 | 57.1 | 74.7 |
| 259 | 2 | 89.0 | 14 | 20.7 | 26 | 11.1 | 22 | 56.0 | 72.3 |
| 260 | 2 | 24.2 | 21 | 82.9 | 26 | 48.1 | 22 | 15.2 | 79.6 |
| 261 | 2 | 92.9 | 21 | 19.9 | 26 | 46.2 | 22 | 14.6 | 76.4 |
| 262 | 2 | 23.3 | 21 | 79.9 | 26 | 11.6 | 22 | 58.6 | 76.7 |
| 263 | 2 | 89.6 | 21 | 19.2 | 26 | 11.1 | 22 | 56.3 | 73.7 |

Applications

The compounds of the present invention are useful as polymeric emulsifiers and can be used in a wide range of applications, emulsions (oil in water and silicone in water), invert emulsions (water in oil and silicone in water). The variations are made by altering the amount of me-peg in the molecule.

Another key advantage of the compounds of the present invention is the ability to provide polymers that are soluble over a wide range of solvents, including but not limited to oil, polar oils like esters, alcohol, hydroalcoholic solutions, and water. Delivered out of these solvents the compounds of the present invention are polymeric emollients and moisturizers.

In biochemical applications, partition coefficients is often expressed in terms of an octanol/water coefficient (Ko/w)—the ratio at equilibrium of the concentration of a non-ionized organic compound in an organic solvent (e.g., octanol) versus the concentration of the compound water. Ko/w has been correlated with lipophilicity, the affinity of a compound for a lipophilic environment. Compounds having Ko/w of greater than one are lipophilic; those below one are hydrophilic. Ko/w thus provides an important predictive measure of the ability of a compound to pass through the acid mantle and permeate the lipophilic membranes of cells of the epidermis and dermis. Polar (i.e., hydrophilic) materials extract a different, but also highly-desirable class of compounds from botanical materials. The ability to extract a variety actives (i.e., both lipophilic and hydrophilic) over a wide range of polarities has heretofore been unattainable.

Prior to the present invention, extraction technology has been limited by the nature of available solvents (e.g., oil, aqueous, hydroalcohol and glycol). Surprisingly, applicants have discovered that a series of silicone molecules customized to alter their solubilities in oil, water, silicone and hydroalcoholic solvents produces an almost infinite number of extraction solvents that selectively and specifically extract desired active fractions from botanical materials. In addition to improving extraction efficiency, the customized polymer extraction vehicles of the present invention contribute to the aesthetics and functionality of topical formulations—they impart outstanding skin feel and are non-irritating while retaining the actives on the skin for longer periods of time.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:

1. A citrate co-polyesters made by the reaction of:
   (a) a mixture of
      (i) poly(ethylene glycol) monomethyl ether having following structure;

$CH_3(CH_2CH_2O)_a$—H wherein;
         a is an integer from 5 to 25;
   and
      (ii) fatty alcohol selected from the group consisting of:

R—OH  (i)

wherein;
         R is alkyl having 8 to 34 carbon atoms and may be saturated, unsaturated or R—OH is a guerbet alcohol,
         with the proviso that —$(CH_2CH_2O)_aCH_3$ makes up 4-95%;
   (b) poly(ethylene glycol) having the following structure:

$HO(CH_2CH_2O)_xH$ x is an integer ranging from 5 to 25;
   (c) alkyl diol having the following structure:

$HOCH_2(CH_2)_yOH$ wherein;
         y is an integer ranging from 2 to 11; and
   (d) citric acid having the following structure:

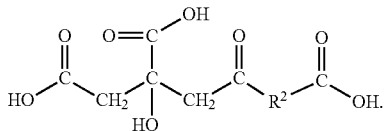

2. A citrate co-polyesters of claim 1 wherein a is an integer ranging from 5 to 15.
3. A citrate co-polyesters of claim 1 a is an integer ranging from 20 to 25.
4. A citrate co-polyesters of claim 1 wherein x is 5.
5. A citrate co-polyesters of claim 1 wherein x is 15.
6. A citrate co-polyesters of claim 1 wherein x is 25.
7. A citrate co-polyesters of claim 1 wherein y is 2.
8. A citrate co-polyesters of claim 1 wherein y is 9.
9. A citrate co-polyesters of claim 1 wherein y is 11.

* * * * *

UNITED STATES PATENT AND TRADEMARK OFFICE
CERTIFICATE OF CORRECTION

Page 1 of 1

PATENT NO.       : 8,785,676 B1
APPLICATION NO.  : 13/374704
DATED            : July 22, 2014
INVENTOR(S)      : Thomas G. O'Lenick It is certified that error appears in the above-identified patent and that said Letters Patent is hereby corrected as shown below:

In the Claims

In Claim 1 (Col 14 line 10 delete):

" 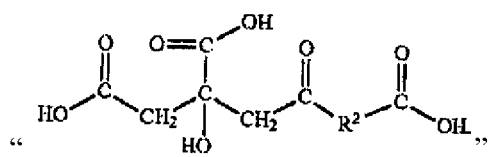 ", and insert therefore:

-- 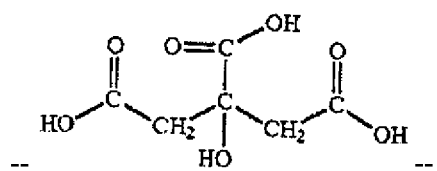 --

Signed and Sealed this
Fourth Day of November, 2014

Michelle K. Lee
*Deputy Director of the United States Patent and Trademark Office*